June 13, 1944. E. J. ABBOTT Re. 22,492

WINDING MACHINE

Original Filed Nov. 24, 1931 7 Sheets-Sheet 1

June 13, 1944. E. J. ABBOTT Re. 22,492

WINDING MACHINE

Original Filed Nov. 24, 1931 7 Sheets-Sheet 2

Inventor
Edward J. Abbott
by Roberts, Cushman & Woodberry.
Attys.

June 13, 1944. E. J. ABBOTT Re. 22,492

WINDING MACHINE

Original Filed Nov. 24, 1931 7 Sheets-Sheet 3

June 13, 1944. E. J. ABBOTT Re. 22,492

WINDING MACHINE

Original Filed Nov. 24, 1931 7 Sheets-Sheet 4

Inventor
Edward J. Abbott
by Roberts, Cushman & Woodberry
Att'ys.

June 13, 1944. E. J. ABBOTT Re. 22,492
WINDING MACHINE
Original Filed Nov. 24, 1931 7 Sheets-Sheet 5
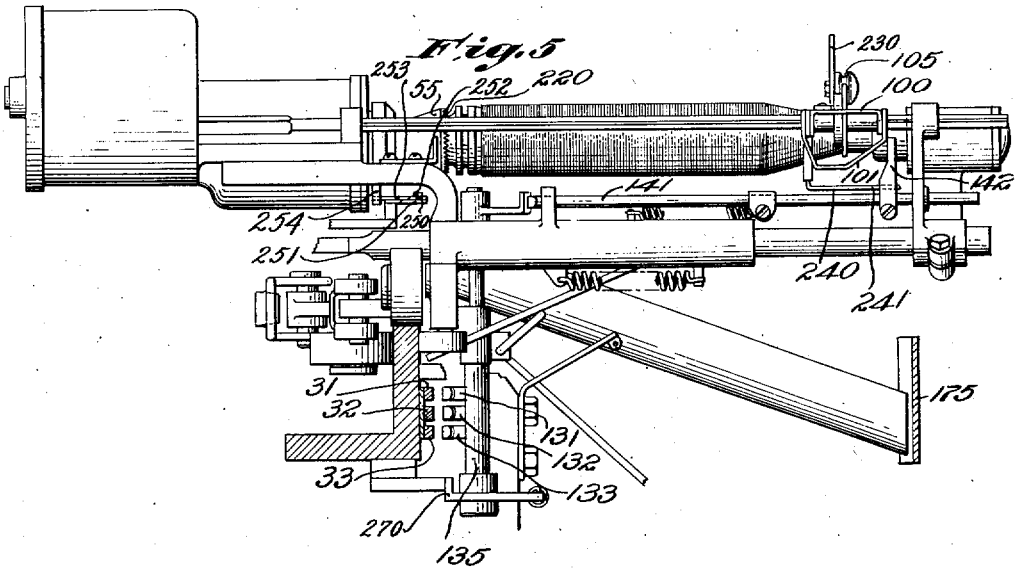
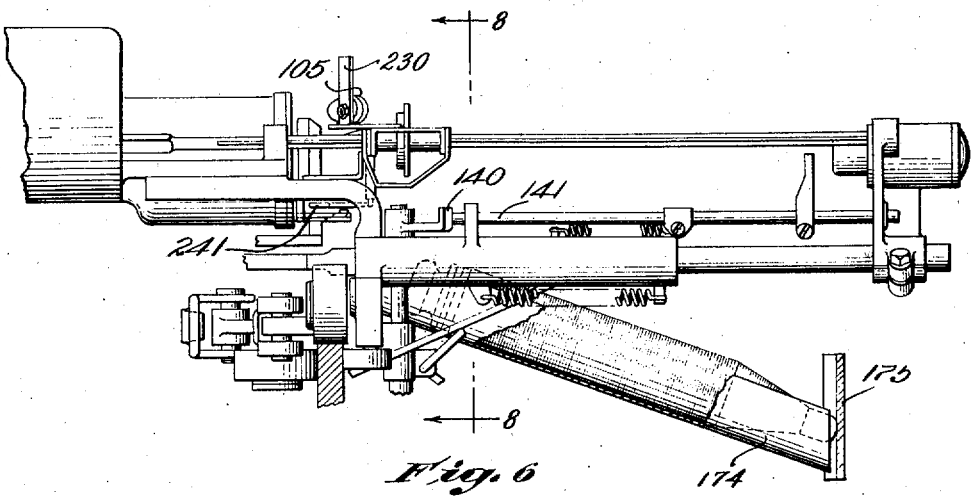
Fig. 6
Inventor
Edward J. Abbott
by Roberts, Cushman & Woodbury,
Attys.

June 13, 1944. E. J. ABBOTT Re. 22,492

WINDING MACHINE

Original Filed Nov. 24, 1931 7 Sheets-Sheet 6

Inventor
Edward J. Abbott
by Roberts, Cushman & Woodbury
Attys.

June 13, 1944. E. J. ABBOTT Re. 22,492

WINDING MACHINE

Original Filed Nov. 24, 1931 7 Sheets-Sheet 7

Inventor
Edward J. Abbott
by Roberts, Cushman & Woodford
Att'ys.

Reissued June 13, 1944

Re. 22,492

UNITED STATES PATENT OFFICE 22,492

WINDING MACHINE

Edward J. Abbott, Wilton, N. H., assignor to Abbott Machine Company, Wilton, N. H., a corporation of New Hampshire Original No. 2,160,810, dated June 6, 1939, Serial No. 576,978, November 24, 1931. Application for reissue June 19, 1942, Serial No. 447,662

54 Claims. (Cl. 242—32)

This invention relates to winding machines and has for some of its principal objects to provide a winding machine wherein a new core is automatically substituted for a completed package and wherein winding is automatically begun upon the replenished core without the necessity for any prewinding of such core or any uniting or tying of one strand to another; a further object is to provide an automatic machine in which these operations are performed on a series of traveling winding carrier units which progress in a procession around the machine.

Other principal objects of the invention are to provide a winding machine in which the winding packages travel in a predetermined path in relation to the machine, usually in a procession, and wherein the winding strands are wound on the several packages in overlapped layers which advance axially of their respective packages; and to provide automatic mechanism competent to control the movement of traversing yarn guides in relation to the several traveling packages so as to perform the above described process of winding.

Other objects of invention and features of novelty and utility will be apparent from this specification and its accompanying drawings in which my invention is explained by the description of one illustrative embodiment thereof.

Figure 3:
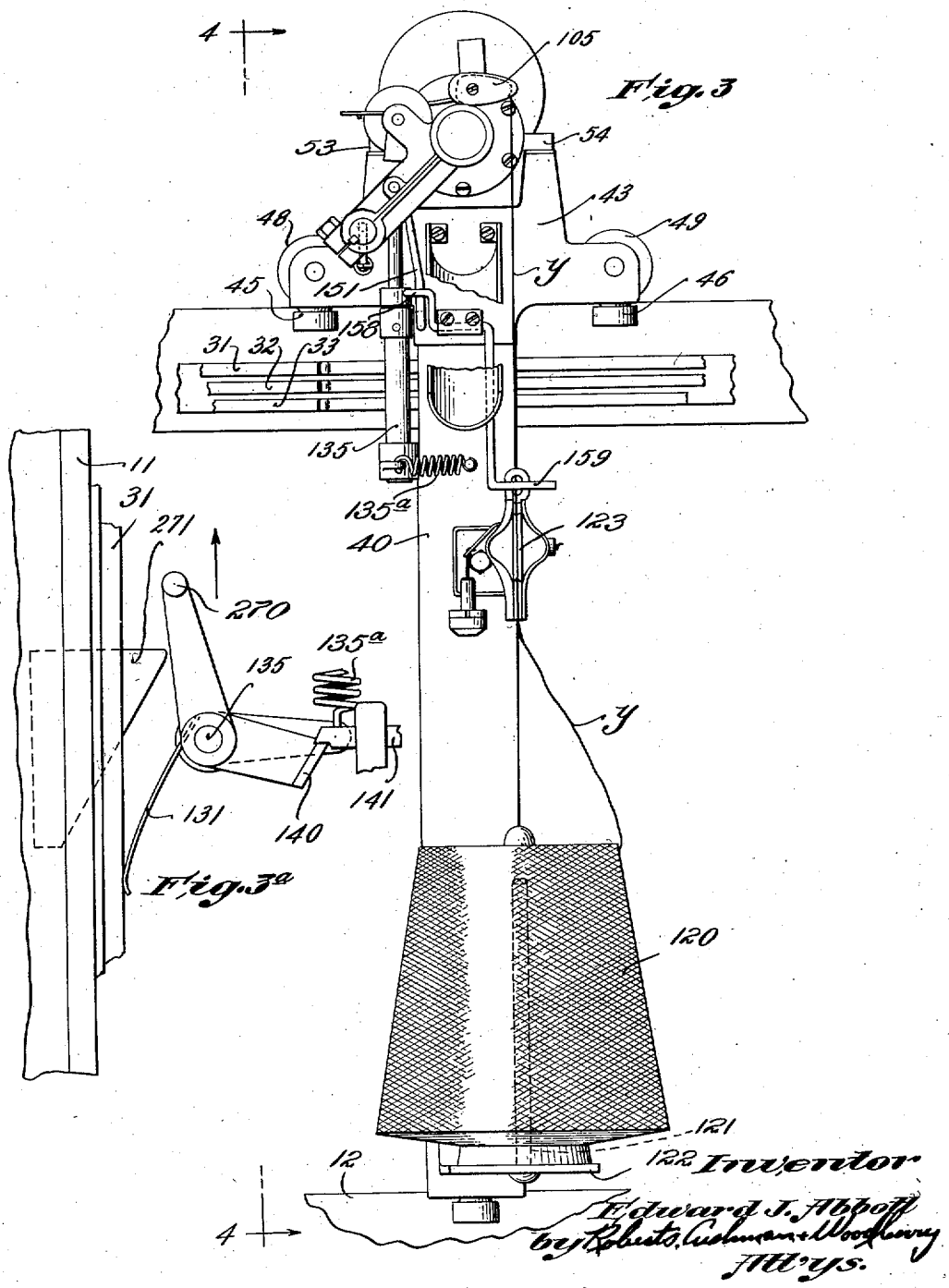
Fig. 3 is a fragmentary elevation of one of the winding units of the machine.
Figure 4:
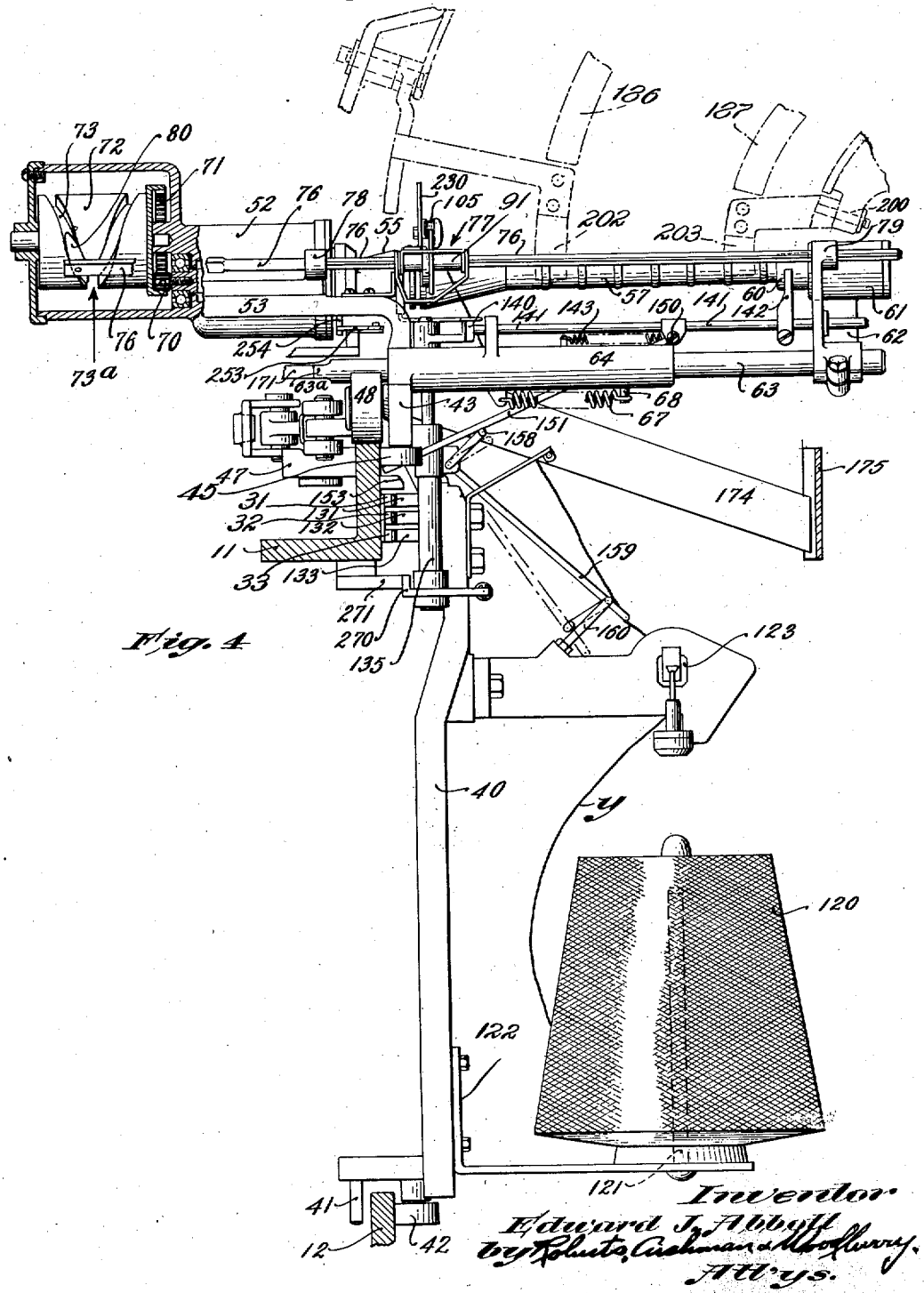
Figure 7:
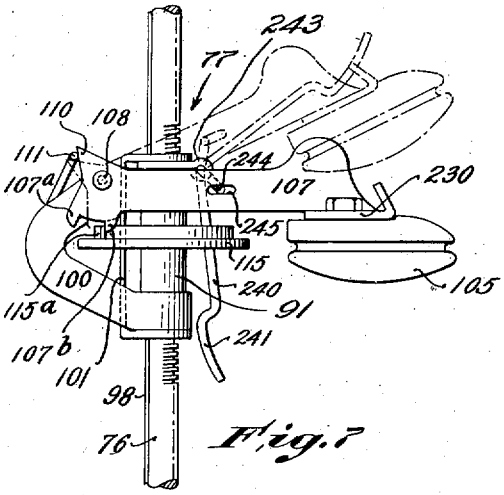
Figure 8:
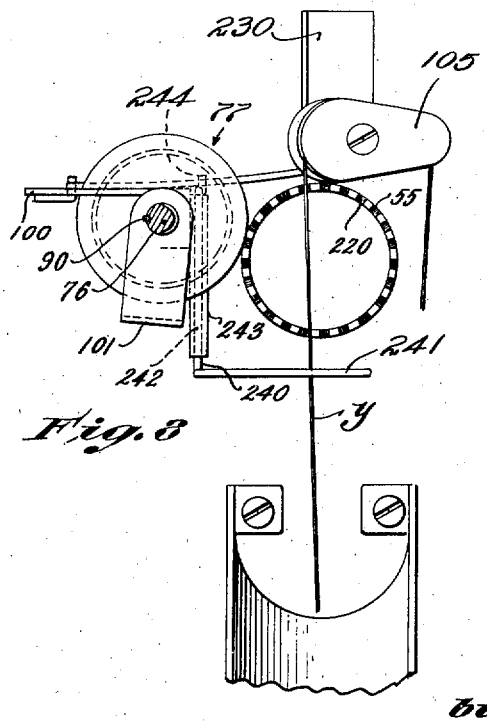
Figure 12:
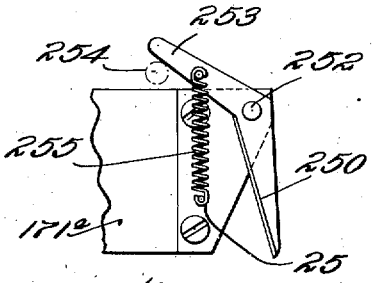
Figure 10:
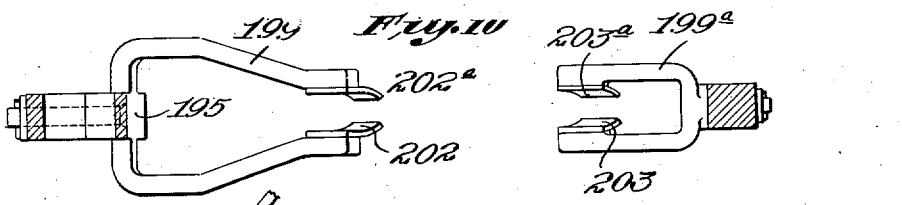
Figure 9:
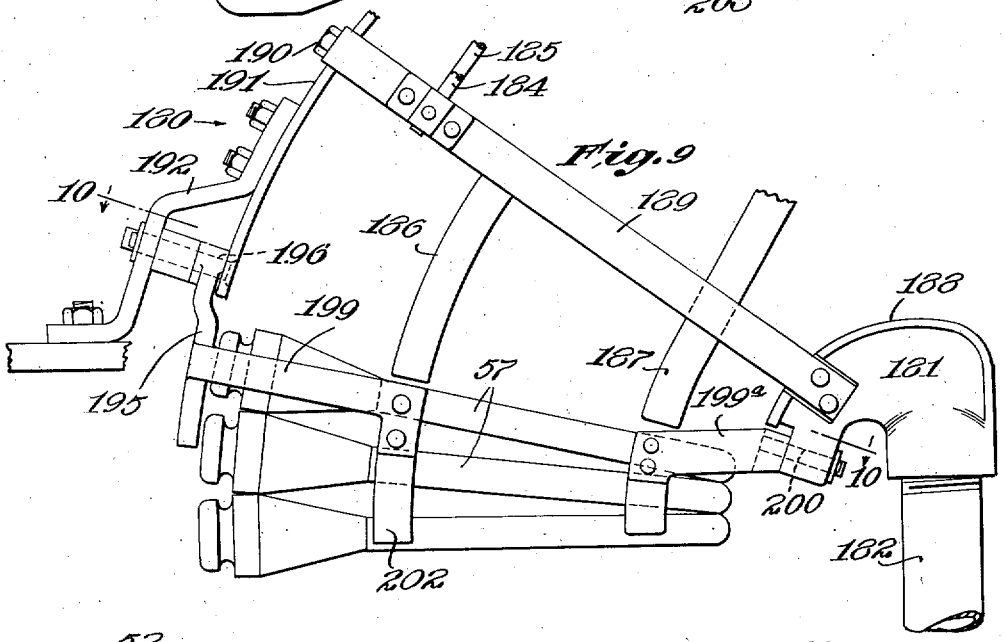
Figure 13:
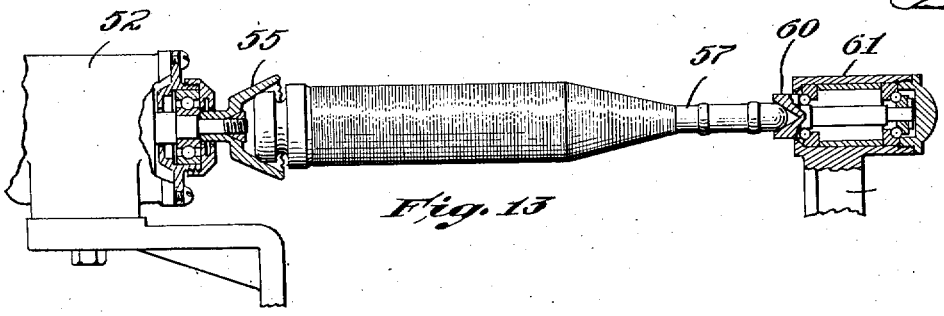
Figure 11:
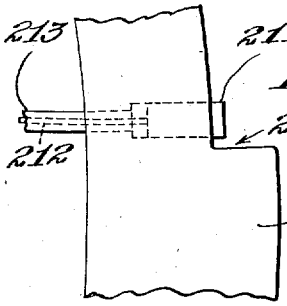

Fig. 3ª is a fragmentary diagram in plan, showing the mechanism which acts to reset the brushes into engagement with the conductor rails;

Fig. 4 is a vertical section taken at right angles to Fig. 3, for instance on the line 4—4 of Fig. 3, showing in outline the relative positions of core-supply and traveling core-holding instrumentalities; the winding unit having just received a fresh core and being in the act of beginning winding thereon;

Fig. 5 is a vertical section like Fig. 4, showing the winding unit at the time of completion of a wound package on the core and after stoppage of winding, and just prior to the doffing of the wound package;

Fig. 6 is a similar view of the unit at the time of doffing of the wound package and placing of the supply strand in position to be engaged by a new core;

Fig. 7 is a fragmentary plan view of the traverse guide and the strand-positioning arm of a winding unit, showing in dotted lines these same parts in the relative positions assumed in positioning the strand for engagement by a fresh winding core;

Fig. 7ª is a horizontal section similar to but on a larger scale than Fig. 7, showing particularly the disengageable driving connection between the traverse guide and its driving rack;

Fig. 8 is a vertical section on the line 8—8 of Fig. 6, showing the traverse guide and strand-positioning arm after completion of a wound package and just before engagement of the strand by a fresh winding core;

Fig. 9 is a fragmentary elevation of the core magazine of the machine;

Fig. 10 is a section on the line 10—10 of Fig. 9;

Fig. 11 is a fragmentary plan view illustrating a part of the mechanism for stopping travel of the carrier units upon the detection of failure to supply a fresh core to a carrier;

Fig. 12 is a fragmentary plan view showing mechanism for severing supply strands from completed wound packages; and Fig. 13 is a vertical section through the hollow centers of a winding unit, showing a core retained for winding.

The machine illustrated herewith exemplifies an improved mode of textile strand manipulation characterized by causing a winding strand package to travel in a predetermined path in relation to the machine while winding a strand on the package in overlapped layers which advance axially of the package.

Typically this operation is performed simultaneously in respect to a large number of winding packages; a procession is thus formed of packages in all stages of development from a freshly fed bare core to a completely wound package ready for doffing. As illustrative of the winding performed on any one of the traveling packages, the winding strand may be caused to traverse a portion of the package to form a layer of short length, whereupon the range of traverse is automatically shifted axially of the package and another like layer wound. The illustrated machine of the present invention provides for the automatic supply of empty cores to traveling core-holders at a predetermined part of their path about the machine, provides for automatically associating supply strands with the serially replenished core holders, provides for automatically strating winding of the strands upon their respective traveling cores to form packages thereon, and preferably provides for causing (during the travel of the winding packages) relative traverse between winding packages and winding strands competent to effect the above described mode of winding on each package. Upon completion of winding of any of the traveling packages the machine is capable of automatically stopping further winding thereon; capable of depositing the wound package at a designated delivery point; and capable of severing the wound package from its supply.

*Preferred form of guideway and winding unit conveying devices*

Figure 1:
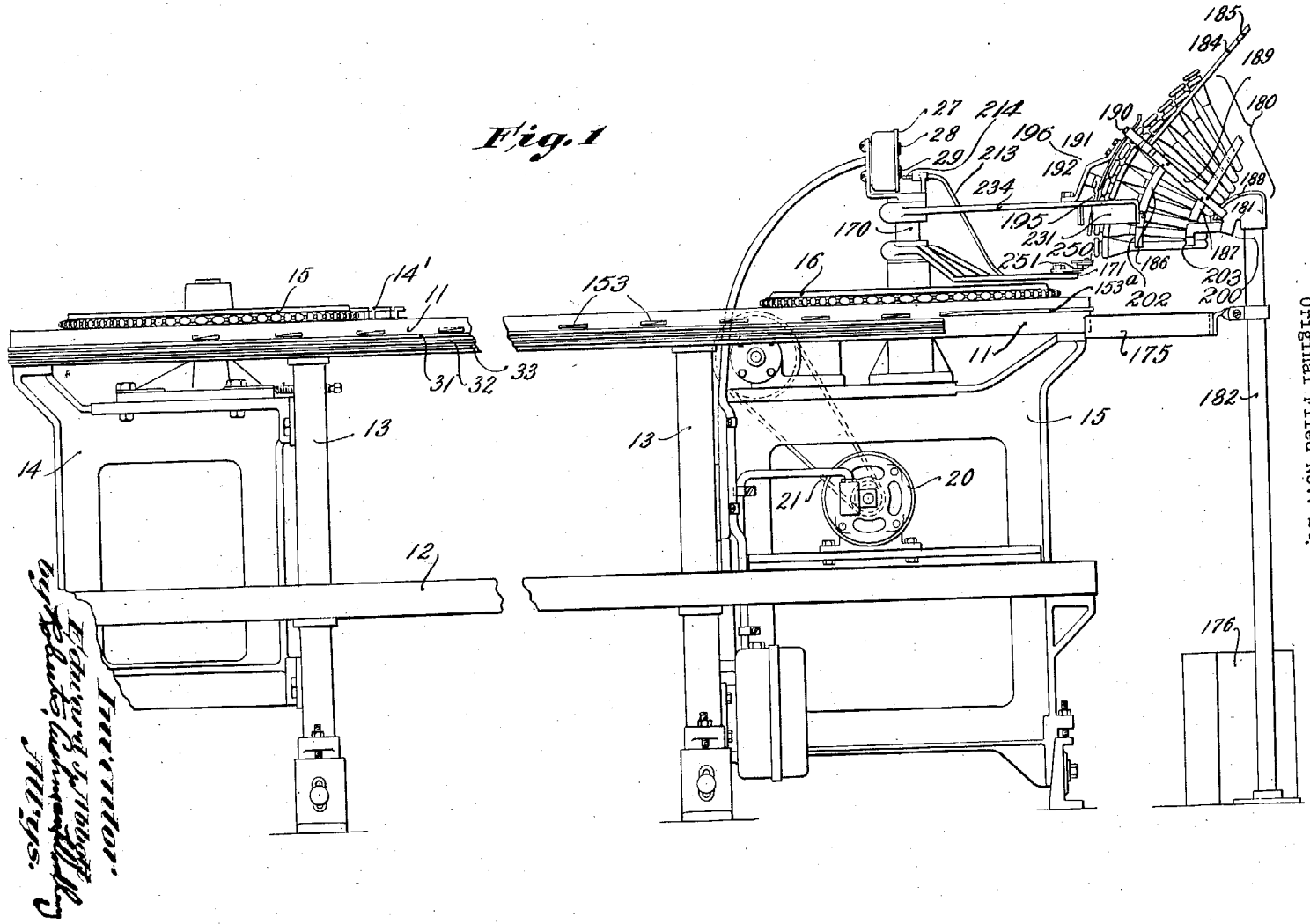
Fig. 1 is a side elevation of a machine embodying the present invention, with the winding units of the machine omitted.
Figure 2:
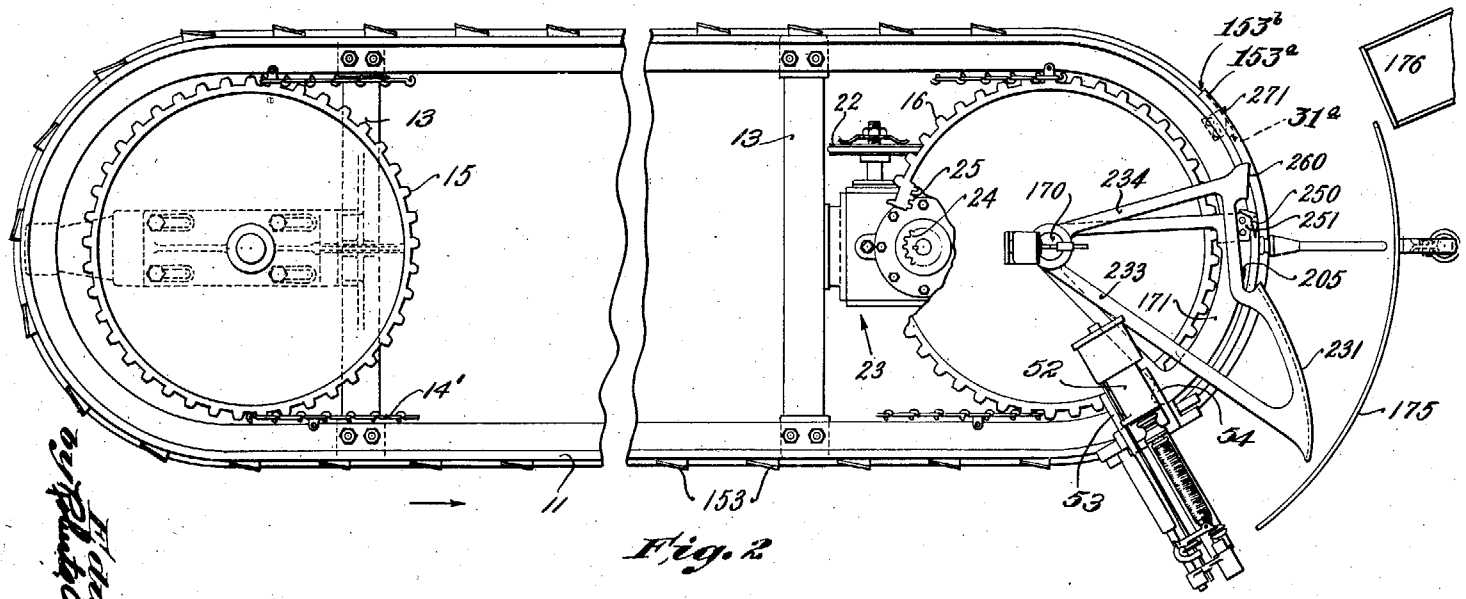
Fig. 2 is a plan of the machine of Fig. 1, showing one of the several winding units of the machine, the other winding units and a part of the core magazine being omitted.

Referring to Figs. 1 and 2, a suitable guideway for the various winding units of the machine may comprise upper and lower rails 11 and 12, each disposed in opposite straight and semi-circular runs, (Fig. 2) and supported by transverse frame sections 13, and longitudinal end frame sections 14 and 15, (Fig. 1).

Suitable means for conveying the several winding units of the machine along the rails 11 and 12 may comprise an endless chain 14' (Figs. 1 and 2) running on opposite sprocket wheels 15 and 16. Either of these sprocket wheels may be driven by any suitable connections, such for example, as those shown in my Patent No. 1,609,639; as illustrated herein the sprocket wheel 16 is driven by an electric motor 20, which is connected thereto by means of a belt 21, pulley 22, (Fig. 2) a set of reduction gearing indicated at 23, and a pinion 24 meshing with internal gear teeth 25 on the sprocket wheel, as more fully explained in my copending application, Serial No. 542,011, filed June 4, 1931. A suitable switch 27, having buttons 28 and 29 for starting and stopping respectively, is adapted to control the motor 20 and hence the progress of the winding units about the machine.

Preferably the several traveling winding units derive their power for winding from individual motors traveling therewith about the machine. With this in view, the upper rail 11 of the machine frame preferably carries electric conductor rails 31, 32, 33, herein shown as three in number, suitably insulated from the frame and adapted to supply current to the traveling units, as described in my copending application, Serial No. 508,868, filed January 15, 1931, Patent No. 1,964,715.

*Preferred general organization of a traveling winding unit*

An individual traveling winding unit preferably includes, like the machines of my above patent and copending applications, a main frame member 40 (Fig. 4) adapted to bridge the distance between upper and lower guide rails 11 and 12, confined to the lower rail by a pin 41 and roll 42, and carrying at its top a head member 43. Upon this head member 43 are preferably provided horizontally disposed spaced outer rolls 45 and 46 (Fig. 3) and an inner roll 47 (Fig. 4) adapted respectively to run on opposite faces of the upper rail 11, and the whole unit is movably supported on this rail by means of spaced vertically disposed rolls 48 and 49 (Fig. 3) running on the top edge of the rail.

An electric motor 52 is preferably mounted upon two spaced horizontal inward extensions 53 and 54 (Fig. 2) of the head member 43. Current for operating the motor 52 is preferably conducted thereto through brushes 131, 132 and 133 (Figs. 4 and 5) carried by a rotatable shaft 135 on the carrier and adapted to press against the stationary conductor rails 31, 32 and 33. From the brushes 131, 132 and 133, suitable wires, not shown, extend to the motor. The motor 52 is arranged to rotate the winding package, a preferred driving connection to such package consisting of a hollow center 55 (Figs. 5, 8 and 13) fast on the motor shaft and shaped to receive one end of a winding package core. Such core may be for example the typical filling or weft bobbin indicated at 57 in Fig. 4.

The other or outer end of the core is preferably held in a revolving hollow center 60 mounted in ball bearings retained in a housing 61. Means is preferably provided for moving the outer hollow center 60 toward and from the inner center 55 to grasp and to release the cores successively handled by the unit. As shown in Fig. 4 the housing 61 for the outer center 60 is fastened by a bracket 62 to a rod 63 which is mounted for reciprocation in a sleeve 64 fast to the head portion of the carrier unit. A spring 67 acting on a pin 68 which projects down from the rod 63 through a slot (not shown) in sleeve 64 urges the rod 63 and outer housing to the left in Fig. 4, thus gripping the core 57 for winding. The inner end 63a of rod 63 preferably projects from the left of sleeve 64 in position to be engaged by actuating means (explained hereinafter) for controlling the position of rod 63 and center 60 so as to grasp and release the cores at predetermined positions of the carrier unit in its path.

The traverse mechanism, such as will now be described, is preferably arranged to perform its strand distributing operation without imparting any substantial twist to the strand. Preferably this traverse mechanism derives its power from a pinion 70 on the motor shaft, said pinion meshing with an internal gear 71 on the end face of a traverse cam 72. The casing of motor 52 may be extended, as shown, to enclose the cam 72. To provide a rapid traverse with a cam of small size, this cam is preferably of the crossed groove type, having a groove 73 in the form of reverse spirals crossing at 73a. A rod 76, carrying a traverse assembly 77 and mounted to slide in guides 78 and 79, has mounted at its left end a cam follower 80 adapted to run in the groove 73 of the traverse cam; operation of these elements imparts to the traverse assembly 77 a reciprocating movement along the axis of the rotating core 57 within a range equal to the throw of the cam 72. In the form of the device illustrated herein, the traverse assembly moves from one end of its relatively rapid reciprocating stroke to the other during the time required for twenty revolutions of the core 57.

Figure 7A:
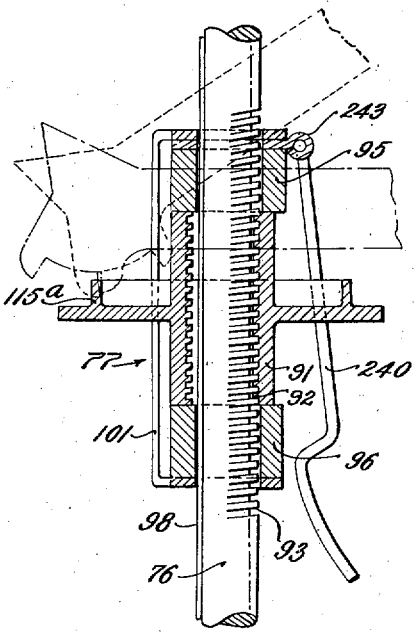

Means is preferably provided for automatically shifting the range of movement of the traverse assembly to make the wound package consist of overlapped axially advancing layers, such means preferably acting in response to growth of the winding package. A preferred form of such means will now be described by reference to the construction of the illustrated traverse assembly 77. Referring to Figs. 7, 7a and 8, the traverse assembly 77 shown therein includes a central rotatable tubular part 91 having internal threads 92 adapted to engage corresponding half-threads 93 on the reciprocating rod 76. At opposite ends of tubular part 91 are two non-rotatable elements 95, 96 each cut away to engage a key 98 on the reciprocating rod 76. These two non-rotatable elements are fastened together by upper and lower yokes 100 and 101. The central rotatable tubular part 91 of the traverse assembly is provided with an enlargement in the form of a wheel 115 adapted to engage the surface of the last-wound layer of strand on the winding package when the traverse assembly attains the inner or rear point in its stroke. Contact of the wheel 115 and the rotating package in this way rotates the wheel 115, causing its associated inner rotatable member 91 to turn a small amount on the threaded rod 76, thus advancing the whole traverse assembly slightly. This manner of advance of the traverse assembly is repeated each time sufficient strand is wound on a given layer. A wound bobbin is thus built with a very uniform diameter; the "build" or advance of range of the traverse guide is automatically regulated by the growth of the package regardless of the count of yarn and speed of winding.

The traverse yarn guide is herein shown as comprising a porcelain knob 105, which is disposed over the winding core 57 in position to receive a supply strand Y from beneath the core, conduct the strand above the core and to deliver it downwardly to the forming winding on the core.

The porcelain knob 105 is preferably held on the outer end of an arm 107 which is pivotally mounted at 108 on the upper yoke 100. An enlargement 110 on arm 107 is normally acted on by a spring 111 to hold the arm and porcelain 105 in the full line positions of Fig. 7. The porcelain guide 105 is capable of vertical movement such that it can ride upon the surface of the winding package and is held there by its own weight and by the pull of the strand passing over it.

The supply of strand for winding on a core is preferably carried on the individual traveling carrier unit in the form of a wound package 120 retained on a suitable peg, spindle or other holder 121 carried on a bracket 122 extending outward from the lower part of the carrier frame member 40 as shown in Fig. 4. From the supply, the strand passes upward through a suitable tension device 123 to the traverse guide 105.

*Automatic stoppages of winding*

(a) *Upon completion of full package.*—The rotatable rod 135 which carries the brushes 131, 132 and 133 is urged by a spring 135ª (Fig. 3ª) to rotate in a counterclockwise direction (viewed in plan), so as to disengage the brushes from their respective rails 31, 32 and 33, but is normally held against such movement by a reciprocable rod 141 which engages a latch member 140 at the top of the rod 135. (Figs. 3ª and 4.) Reciprocable rod 141 carries, near its right or outer end, an adjustable abutment 142 positioned thereon so that may be engaged by the traverse assembly 77 when the latter nearly reaches the right end of its travel which occurs when the winding operation is substantially completed. Movement of the abutment 142 to the right by the traverse assembly 77 moves the rod 141 against the action of a spring 143, (Fig. 4), disengaging the rod 141 from latch member 140 and permitting rotatable rod 135 to remove the brushes 131, 132 and 133 from the rails 31, 32 and 33, thus stopping the motor 52. Thus during the travel of the carrier unit about the machine the winding operation is automatically stopped when the winding package attains a predetermined size.

(b) *Upon breakage or exhaustion of the supply strand.*—The reciprocable rod 141, which acts to release rotatable rod 135 for stoppage of the motor, has pivoted thereon at 150 (Fig. 4) a rod 151 of a length sufficient to engage any one of a series of cams 153 (Figs. 1, 2 and 4) disposed at intervals along the upper guide rail 11. As indicated in Fig. 2, each of these spaced cams 153 increases in width in the direction of travel of the carrier units; the effect of a cam 153 is to force outwardly the rod 151 of any of the carrier units engaged thereby, thus moving the reciprocable rod 141 to the right, releasing a rotatable rod 135 and stopping the motor 52 in the same manner as in stopping winding of a full package. The rod 151 is normally held clear of the cams 153 by a crank 158 (Figs. 3 and 4) forming part of a pivoted detector wire 159 which rests on the strand running from the tension device 123 to the traverse guide 105. Upon breakage or exhaustion of the strand, detector wire 159 drops to the dotted position in Fig. 4, allowing rod 151 to drop into position for its end to be engaged by the next adjacent cam 153, whereupon stoppage of the motor 52 occurs as just explained.

(c) *At the end of a predetermined winding interval.*—As is more fully explained below, winding on each of the traveling carrier units commences as soon as the individual unit has passed around the right-hand end of the machine. Means is provided for automatically stopping winding on any of the traveling units severally at the end of a predetermined interval, which in the case of the present machine is the time required for the individual unit to pass around the machine and return again to the right-hand or replenishing end. By the provision of such means winding ceases at this point, even though the other stop devices described above have not as yet operated.

In the illustrated machine winding may be stopped at the end of a predetermined interval by an arrangement of the current conductors 31, 32 and 33, such as shown in Fig. 1, wherein these conductors end near the right-hand end of the machine; upon reaching the end of these conducting rails, the motor 52 of the traveling carrier unit is deenergized and remains inactive until the carrier unit again reaches the start of these same rails at a point indicated at 31ª (Fig. 2) just before a starting cam 271 described below. If desired, the rails 31, 32, 33, may merely be provided with deenergized sections extending around the right-hand end of the machine to this point 31ª in a manner similar to that disclosed in my copending application Serial No. 508,868, filed January 15, 1931.

*Automatic holding and releasing of winding package core and collection of full packages*

It has been described above how, during its travel along the guide rails, each unit holds a winding package core 57 between a live center 55 and an outer dead center 60, which later is carried by bracket 62 on a reciprocable rod 63. Means is provided for automatically causing the carrier unit to release its core 57 at a predetermined point in its travel. As indicated in Figs. 1, 2 and 4, a fixed vertical post 170, coaxial with the sprocket 16, may carry a cam 171 of such shape and position as to engage the inwardly extending end 63ª of the reciprocable rod 63 of each carrier. Upon contacting with this cam 171, the reciprocable rod 63 of the carrier is forced outwardly, (to the right in Fig. 4) carrying the bracket 62 and outer center 60 with it, thus releasing the winding package core 57. This operation will take place whenever the carrier unit passes slightly beyond the position of the single unit shown in Fig. 2.

It will be observed that upon release of the core 57 (usually carrying a full wound package) the strand extending from the supply 120 is still unbroken. Means is preferably provided for detaining the released core and package on the traveling carrier during the time necessary to associate the strand with new core for resumption of winding. In the illustrated machine, such means is shown as comprising a package receiver in the form of a trough 174 disposed directly beneath the normal winding position of a core and preferably sloping downwardly towards its outer end in the form of a chute as shown in Fig. 4. Cooperating with these troughs or chutes 174 of the several carriers there is preferably provided an arcuate plate 175 (Figs. 1, 2 and 4) disposed to close the outer lower ends of the troughs until the carriers reach a point somewhat beyond the extreme semi-circular end of the machine. Upon reaching the end of this guard plate 173, a full package or partially wound core in the trough 174 of the carrier is free to slide out the end of the trough and into a receptacle 176 suitably positioned. Thus the machine provides for delivering all of the released wound packages at a predetermined part of the travel of the several units.

*Automatic supply of winding package core*

The means provided in the present machine for holding and supplying fresh winding cores to the carrier units is shown as comprising a magazine 180 (Fig. 1) which may conveniently be mounted in part at least upon a bracket 181 carried by a vertical support 182, the magazine being positioned approximately in prolongation of the longitudinal axis of the machine. The exact construction of the magazine will of course vary with the particular kind of winding core to be employed by the machine; for the type of core illustrated the magazine preferably utilizes inclined rods 184, 185, spaced at a suitable distance to hold the cores by their larger head ends with their smaller ends depending as indicated in Fig. 1. The cores slide down the two rods 184 and 185 until they are engaged by spaced arcuate plates 186 and 187 on both sides and their tip ends rest upon a curved portion 188 of the bracket 181. The arcuate plates 186 and 187 are fastened together by a U-shaped strap member 189 connected at its two ends to the bracket 181. The closed end of this U-shaped strap member 189 is connected at 190 to an arcuate plate 191 which in turn is carried by a bracket 192.

The lower portion of the magazine includes an arcuate plate 195 hinged at 196 to the plate 191, and a U-shaped member 199 integral with the arcuate plate 195, (Figs. 9 and 10). Fastened on both sides of this swinging member 199 are downwardly extending spring fingers 202, 202ª, each approximately in prolongation of the plates 186 just above them. The magazine includes also another U-shaped member 199ª pivotally mounted at 200 on the bracket 181 so as to swing about the same inclined axis as the U-shaped member 199. Spring fingers 203, 203ª fastened on member 199ª extend generally in downward prolongation of the upper plates 187. The spring fingers 202, 202ª and 203, 203ª preferably have their lower ends slightly inturned as shown in Fig. 10, yieldingly to hold the lowermost core of a stack in the magazine, as shown in Figs. 1 and 9. The position of the magazine is such that the lowermost core of the stack thus held is in position to be cleared both by the live center 55 and the outer dead center 60, when this outer center has been forced to its outermost position by the action of the cam 171; furthermore, the lowermost core 57 of the magazine is held at the appropriate level to be engaged between these two centers 55 and 60 of a passing unit when the outer dead center is forced inwardly toward the live center 55.

For causing the lowermost core of the magazine thus to be engaged by the core-holding centers on a winding unit, the cam 171 which has previously held the dead center out, abruptly ends at 205 (Fig. 11) allowing the spring 67 to force the center 60 inward or to the left, thus grasping the core 57 firmly between the two centers. Further movement of the traveling carrier beyond this point causes the lower hinged portions 199, 199ª and the spring fingers 202, 202ª and 203, 203ª, to swing about the pivots 196 and 200 until the core 57 is withdrawn from these spring fingers; the spring fingers retain all the remaining cores in the magazine and the hinged lower portions of the magazine swing downward into position to supply a core to the next traveling winding unit.

The pivotal mountings of the lower parts of the magazine are of advantage in allowing the relative motion of the core-holding centers 55 and 60 with relation to the magazine to withdraw a core from the magazine. In addition, such pivotal mountings allow the spring fingers 202, 202ª, 203 and 203ª to swing to permit the reciprocable rod 76 of the traveling unit to pass thereunder without interference. The parts 199 and 199ª although mounted to swing on a common axis, preferably have freedom for independent motion about pivots 196 and 200 because of the fact that the outer tip end of a core moves on a greater radius than the inner end of the core at the curved end of the machine; the pivoted sections of the magazine which retain the two ends of the cores will therefore not move exactly together.

*Automatic cessation of travel of the units upon exhaustion or stoppage of the magazine*

In case the magazine 180 is empty, or in case a core 57 is not in place therein to be engaged between the centers 55 and 60 of a traveling unit, the outer center 60 and reciprocable rod 63 of the unit will travel farther than usual to the left when the end 63ª of rod 63 is released by the end 205 of the cam 171. A push pin 211 (Fig. 11) operating a piano wire 212 in a flexible conduit 213 is disposed immediately beyond the end 205 of the cam 171. This push pin 211 is normally cleared by the end 63ª of the rod 63 when movement of the rod 63 has been checked by the engagement of a core 57. Movement of the rod 63 to a greater distance to the left when the unit fails to engage a core forces this push pin 211 and the piano wire 212 inward. The opposite end of the piano wire carries a pin 214 (Fig. 1) disposed in position to strike and operate the stop button 29 of the push button switch 27. This mechanism thus detects the failure of the magazine to supply a fresh core to a traveling unit, and upon the detection of such failure deenergizes the motor 20 and thereby stops the traveling motion of the various carrier units. In addition to preventing idle movement of the machine in the absence of an available supply of fresh cores this mechanism also serves to prevent any carrier unit from traveling far enough to discharge its wound package until a fresh core has been placed in winding position in the unit. Exhaustion of the supply of winding cores therefore does not necessitate a rethreading of each of the carriers such as would be necessary were the carriers to continue discharging their wound packages after an exhaustion or stoppage of supply of fresh cores.

*Automatic association of the supply strand with the fresh winding core*

The machine in its preferred forms is capable of automatically associating the supply strand which travels with the given carrier with the fresh core without the necessity for any prewinding on the newly supplied core or for any tying of knots.

It will be observed that the location of the porcelain guide eye 105 is such that when the bobbin is released from its centers and dropped into the trough 174, this porcelain eye 105 retains the run of yarn extending from the tension device 123 to the wound bobbin; it is preferably this portion of yarn extending from the porcelain guide eye 105 to the completed released bobbin which is associated with the newly supplied core; thus the traverse guide eye 105, tension device, and any other instrumentalities acting on the strand need not be rethreaded. Means is therefore provided for carrying the portion of yarn which extends from the guide eye 105 to the released bobbin over to the left in Fig. 6 to a position wherein this strand can be associated with a new core inserted between the centers 55 and 60.

Preferably the hollow center 55 which engages the head of the core is provided with means for imparting a winding rotation to such a strand presented thereto so that this portion of the strand, placed in engagement with the hollow center 55, will be caused to wind up upon a core newly placed in the center 55. As shown in Figs. 5 and 8, the center 55 is preferably provided around its rim with toothed serrations 220 forming notches across which the yarn Y may be laid as shown in Fig. 8. A strand thus laid across the serrations in the hollow center 55 will be so positioned as automatically to be gripped between the center 55 and a new core 57 when the core 57 is forced endwise against the center 55 by the outer center 60. In this way the strand leading from the supply 120 can be automatically associated with the new core.

It will be understood that traverse assembly 77 of the unit progresses relatively slowly toward the right during winding and at the completion of winding attains approximately the position shown in Fig. 5. The illustrated machine includes mechanism for automatically restoring this traverse assembly by a rapid return movement to a predetermined position at the opposite end of its travel, and the mechanism employed for this purpose preferably also serves automatically to carry the strand extending from the porcelain guide 105 over into engagement with the serrations 220 of the hollow center 55. As previously described the traverse assembly includes an arm 107 pivoted at 108 and normally held in the full line position of Fig. 7 by a spring 111. This arm 107, which serves to hold the porcelain guide 105, preferably includes an upturned portion 230 (Figs. 5, 6 and 7) adapted to cooperate with a stop cam 231 (Figs. 1 and 2) for moving the traverse assembly to the left. This cam 231 which may conveniently be carried by arms 233 and 234 extending from the vertical post 170 is so positioned as to engage the upstanding extension 230 on the arm 107 soon after the full package has been released by the center 60. Further movement of the carrier around the end of the machine turns the arm 107 to its dotted position in Fig. 7 and moves the entire traverse assembly 77 to its extreme left-hand position on the rod 76 by this engagement of the extension 230 with the cam 231. In order to release the traverse assembly from the threads 93 on the rod 76 during this movement to the left the pivoted arm 107 preferably carries a shoulder 107a (Fig. 7) adapted to strike a rim 115a of the wheel 115. When the extension 230 is struck by the cam 231, and the arm 107 thus swung to the dotted line position of Fig. 7, the portion 107a of this arm striking the rim 115a forces the wheel 115 to the right in Fig. 7 transversely of the rod 76, and disengages the threads 92 on the tubular part 91 from the corresponding threads 93 on the rod 76. The traverse assembly is thus free to slide along the rod 76 under the influence of the cam 231. Upon arrival at the left-hand end of the rod 76 the arm 107 and its attachments still occupy the relative position shown in dotted lines in Fig. 7; in this way, the porcelain eye 105 and the upturned extension 230 are moved past the serrated hollow center 55 and clear the magazine 180 and its retained bobbins.

This movement of the traverse assembly to the left is preferably utilized to associate the strand Y extending down from the porcelain eye 105 with the serrated hollow center 55. For this purpose the traverse assembly preferably carries a wire 240 having a horizontally disposed arcuate portion 241 (Fig. 8) below the level of the hollow center 55, and a vertical portion 242 pivotally mounted to turn about a vertical axis in a loop 243 carried by the traverse assembly. At its upper end the wire 240 is provided with a crank arm 244 which is slidably engaged in a slot 245 in the arm 107. The relations of these parts are such that when the porcelain eye 105 occupies its full line position in Fig. 7, the wire 240 is clear of the path through which a full package drops in being released by the centers 55 and 60. When the arm 107 is swung to its dotted line position in Fig. 7 by the action of the cam 231, the wire 240 swings through an arc of about 120°, as shown by the dotted position of this arm (Fig. 7). During this movement the hook-shaped outer portion 241 of the wire engages the strand which now extends downward from the porcelain eye 105 to the released package. Movement of the traverse assembly to the left along the rod 76 (Fig. 4) causes the arm 240 to carry the yarn Y to the left; the porcelain eye 105 and the wire 240 engaging the yarn above and below the serrated hollow center 55, respectively, place the yarn across this center as shown in Fig. 8.

After this sequence of operations the traveling unit reaches the magazine 180, at which point a fresh bobbin 57 is grasped between the centers 55 and 60 as described above, the head end of the bobbin securing and clamping the strand against the live center 55.

*Automatic severing of the supply strand from the wound package*

Automatic means for cutting off the yarn of the wound package from the portion of the supply strand now clamped is herein shown as comprising upper and lower scissor blades 250 and 251

(Figs. 2, 5 and 12) suitably mounted, for example upon an extension 171[a] of the cam 171, in position to engage between them a portion of the strand extending down from the wire 240 to the released full package when the wire 240 is at its extreme inner or left-hand position. Upper blade 250 is preferably pivoted to the lower blade 251 at 252 and carries integral therewith an inwardly extending crank arm 253. The head portion of the carrier is provided with a depending pin 254 disposed in position to engage this arm 253 in passing and to turn the upper blade 252 so as to sever the yarn. A suitable spring 255 then returns the scissors to their open position ready to operate upon the yarn of the next traveling carrier unit.

*Resetting of traverse mechanism in position to wind*

After clamping the strand between the new core and the hollow center 55 and severing the completed package from this strand, the traverse guide 105 is automatically carried over to the yarn receiving portion of the core in position for winding to commence. For this purpose there is preferably provided a cam 260 (Fig. 2), conveniently mounted integral with one of the supports 234 of the cam 231,—this cam 260 projecting into the path traversed by the upper projection 230 of the traverse assembly. Upon contacting with this cam 260, the projection 230, the arm 107 and porcelain guide eye 105 are returned to positions such as are shown in full lines in Fig. 7. The cam 260 is so positioned with respect to the position of a new core 57 as to leave the porcelain eye 105 at approximately the head end of the core in position to start a layer of winding at this end. Meanwhile the end of the yarn Y which extends over the porcelain eye 105 remains anchored between the end of the core 57 and the hollow center 55 so that when the hollow center 55 begins to turn the yarn is drawn on to the rotating core.

When the arm 107 and eye 105 are returned to their full line positions in Fig. 7 in position to start winding, a projection 107[b] on arm 107 contacts with an inner surface of the rim 115[a] on the wheel 115 and urges the associated threaded barrel 91 into engagement with the half-threads 93 on the rod 76. The traverse assembly is thus fastened to the rod 76 so as to be moved therewith as the rod 76 reciprocates under the influence of the cam 72 in winding.

*Resetting of stop motion mechanism and resumption of winding*

When the carrier encounters the live conductor rails 31, 32 and 33 on the opposite side of the machine from that shown in Fig. 1, a resetting mechanism acts to restore brushes 131, 132, 133 into position such as shown in Fig. 4, in contact with these rails. It will be understood that in the case of most of the carrier units, the rod 135 will previously have been rotated (either as a consequence of breakage or exhaustion of the yarn or the completion of a full package) so as to remove the brushes from contact with their rails. To restore the brushes into contact with the rails the crank arm 270 is provided on the lower end of rotatable rod 135 in position to engage a cam 271 located at the beginning of the conductor rails 31, 32 and 33 on the far side of the machine. When the crank arm 270 encounters this cam it is rotated thereby in a direction opposite to that induced by the spring 135[a]. This rotates the vertical rod 135 and restores the brushes into position to contact with the conductor rails. The latch member 140 which has occupied a position behind the rod 141 (when these parts are viewed as in Figs. 4, 5 and 6), now forces this rod 141 slightly to the right by a camming action and passes its end allowing this rod to snap back behind it, the latch member 140 now being in front of the tip end of rod 141 as shown in Figs. 4 and 3[a]. The interengagement of rod 141 with latch member 140 thus locks the brushes 131, 132 and 133 in their operative positions, in contact with rails 31, 32 and 33.

By the time the crank arm 270 leaves the cam surface 271 the motor 52 will have started, the strand will be winding upon the fresh core 57, and the portion of the strand engaged by the detector arm 159 will be under tension so that the brushes 131, 132 and 133 will not again be disengaged until some condition of breakage or exhaustion of the strand occurs or a full package is completed. The last stop-motion cam 153 on the side of the machine shown in Fig. 1 is preferably extended around the curved end of the machine to a point 153[b] just beyond the starting cam 271 in the form of a ledge 153[a] on top of which the stop-motion rod 141 can ride. This rod 141 is thus supported during the time in which there is no winding tension on the supply strand.

Since the various operations incident to the automatic control of winding and to the automatic replenishment and initiation of winding have been described for one of the several traveling carrier units, no further description of the operation of the machine as a whole is deemed necessary; it will be understood that the various controlling and replenishing operations are performed with relation to each of the several carrier units, the carrier units being subjected in regular order to the several replenishing operations.

It should be understood that the present disclosure is for the purpose of illustration only and that this invention includes all modifications and equivalents which fall within the scope of the appended claims.

I claim:

1. A textile machine having therein a carrier adapted to carry a winding strand package core and an unwinding supply strand mass, means for moving the carrier in a predetermined path in relation to the machine, means for winding a strand from the supply strand mass onto the winding strand package core during such motion, means for distributing the strand on the core in progressively axially advancing conical layers of less length than the finished package, in combination with means operative after winding of a package on the core for automatically associating the strand of a supply mass remaining on the carrier with a fresh core for initiating the winding of a new strand package on the carrier, means for supplying a fresh core to the carrier, means for doffing a wound core from the carrier, and means for positioning the strand-distributing means for the beginning of a new winding on a fresh core.

2. A textile machine having therein a carrier adapted to carry a winding strand package core and an unwinding supply strand mass, means for moving the carrier in a predetermined path in relation to the machine, means for winding a strand from the supply strand mass onto the winding strand package core during such motion, means for doffing the said package from the carrier, means for automatically providing a fresh winding package core on the carrier, and means for associating the strand from the supply mass remaining on the carrier with such core for winding thereon.

3. In a winding machine, the combination of a rotatable center recessed to receive an end of a winding package core, the part of said center surrounding the recess having serrations to receive a strand laid across said recess, means for automatically laying a strand across the recess of said center and means for automatically putting an end of the winding package core into the said recess.

4. In a winding machine, the combination of a rotatable center recessed to receive an end of a winding package core, and having means around the recess for detaining a strand in position to be secured between the center and a core held thereagainst, means for automatically laying a strand across the recess of said center and means for automatically putting an end of the winding package core into the said recess.

5. In a winding machine, the combination of rotatable means for catching and instituting winding of a strand, and a hollow center rotatable with said means and recessed to receive and position the end of a core in contact with said strand, means for automatically laying a strand across said rotatable means and means for automatically putting an end of a winding package core into the said recess.

6. In a winding machine, the combination of means for holding a winding package core for rotation, said means including a hollow rotatable center recessed to receive and embrace one end of said core, said hollow center being shaped to engage and detain a strand presented thereto to institute winding of the strand, automatic means for presenting a strand to said center and means for automatically putting an end of a winding package core into said recess in contact with said strand.

7. In a winding machine the combination of means for holding a winding package core for rotation, said means including a rotatable hollow center recessed to receive one end of said core, a traversing strand guide engageable with the winding strand and mechanism for driving the strand guide to distribute the strand in conical layers of less length than the finished package length while progressing relatively slowly away from said end of the core to near the opposite or tip end of the core, means for doffing a core and a package wound thereon from said holding means, means for returning the strand guide relatively quickly, as compared with such slow progression, towards said hollow center at the beginning end of the core after completion of the winding of said conical layers, automatic means for laying the portion of the strand extending from the doffed package to the said strand guide across said hollow center, means for automatically putting the end of a new core into the recess of the hollow center, means for severing the strand between the finished package and the new core and means for automatically resuming traversing of the strand guide.

8. In a winding machine, the combination of means for holding a winding package core for rotation, said means including a rotatable hollow center recessed to receive one end of said core, a traversing strand guide engageable with the winding strand and mechanism for driving the strand guide with a relatively short stroke to distribute the strand in conical layers of less length than the finished package length while progressing relatively slowly away from said end of the core to near the opposite or tip end of the core, means for doffing a core and a package wound thereon from said holding means, means for returning the guide relatively quickly, as compared with such slow progression, towards said hollow center at the beginning end of the core after completion of the winding of said conical layers, automatic means for laying the portion of the strand extending from the doffed package to the said strand guide across said hollow center, means for automatically putting the end of a new core into the recess of the hollow center after the strand guide has been brought from the last conical layer of the package to adjacent to the said hollow center, means for severing the strand between the finished package and the new core and means for automatically resuming said short stroke of the strand guide adjacent to said beginning end of the new core.

9. In a winding machine, the combination of means for holding a winding package core for rotation, said means including a rotatable hollow center recessed to receive one end of said core, a traversing strand guide engageable with the winding strand and mechanism for driving the strand guide with a relatively short stroke to distribute the strand in conical layers of less length than the finished package length while progressing relatively slowly away from said end of the core to near the opposite or tip end of the core, means for doffing a core and a package wound thereon from said holding means, means for returning the guide relatively quickly, as compared with such slow progression, towards said hollow center at the beginning end of the core after completion of the winding of said conical layers, automatic means for laying the portion of the strand extending from the doffed package to the said strand guide across said hollow center, said automatic means including the strand guide, means for automatically putting the end of a new core into the recess of the hollow center after the strand guide has been brought from the last conical layer of the package to adjacent to the hollow center, means for severing the strand between the finished package and the new core and means for automatically resuming said short stroke of the strand guide adjacent to said beginning end of the new core.

10. In a winding machine, the combination of means for holding a winding package core for rotation, said means including a rotatable hollow center recessed to receive one end of said core, a traversing strand guide engageable with the winding strand, a reciprocating driver extending alongside the path of the strand guide along said core, means for reciprocating said driver with a relatively short stroke to distribute the strand in conical layers of less length than the finished package length, means for relatively slowly shifting the strand guide along said driver in the direction of the length of the core in accordance with the growth of the wound strand mass on the core, means for stopping reciprocation of said driver when the strand guide reaches a position adjacent to the tip end of the core, means for doffing the core and package wound thereon from said holding means, means for shifting said strand guide relatively quickly, as compared with such slow progression, with reference to its said driver to a position adjacent to said hollow center at the beginning end of the core after completion of the winding of said conical layers, automatic means for laying the portion of the strand extending from the doffed package to the said strand guide across said hollow center, means for automatically putting the end of a new core into the recess of the hollow center after the strand guide has been brought from the last conical layer of the package to adjacent to the said hollow center, means for severing the strand between the finished package and the new core, and means for automatically resuming said short stroke of said driver and strand guide adjacent to said beginning end of the new core.

11. In a winding machine, the combination of means for holding a winding package core for rotation, said means including a rotatable hollow center recessed to receive one end of said core, a traversing strand guide, means for doffing a core and a package wound thereon from said holding means, and automatic means for laying the portion of the strand extending from the doffed package to the said strand guide across said hollow center, means for automatically returning the strand guide to the said center across which the strand is laid, and means for automatically starting operation of the strand guide at the end of said core adjacent to said last-named center.

12. In a winding machine, the combination of means for holding a winding package core for rotation, said means including a rotatable hollow center recessed to receive one end of said core, a traversing strand guide engageable with the winding strand and mechanism for driving the strand guide with a relatively short stroke to distribute the strand in conical layers of less length than the finish package length while progressing relatively slowly away from said end of the core to near the opposite or tip end of the core, means for doffing a core and a package wound thereon from said holding means, means for returning the guide relatively quickly, as compared with such slow progression, towards said hollow center at the beginning end of the core after completion of the winding of said conical layers, a pair of strand-engaging parts movable toward the hollow center on opposite sides thereof and engageable with the strand leading to the doffed package to lay said strand across the hollow center, one of said strand-engaging parts constituting the traversing strand guide, means for automatically putting the end of a new core into the recess of the hollow center after the strand guide has been brought from the last conical layer of the package to adjacent to the said hollow center, means for severing the strand between the finished package and the new core, and means for automatically resuming said short stroke of the strand guide adjacent to said beginning end of the new core.

13. A winding machine having therein a holder for rotatably supporting a winding package core, core-supplying means adapted to cooperate with said holder to furnish new cores for the winding of successive packages, said holder and said core-supplying means being arranged with respect to each other for relative motion such that one passes the other at intervals, means for rotating a winding package core held by the holder to wind on said core, traverse means acting to distribute a winding strand on the package, said traverse means including a strand guide movable lengthwise of the package during winding in a path relatively close to the periphery of the winding package, and means for automatically imparting a supplemental movement to said strand guide in a direction such as to cause the strand guide to clear said core-supplying means when the latter supplies a new core to said holder.

14. In a winding machine, the combination of a traversing strand guide engageable with a winding strand and mechanism for driving the strand guide to distribute the strand lengthwise of a winding package core in conical layers of less length than the finished package length, while progressing relatively slowly away from one end of the core to near the opposite or tip end of the core without substantially twisting the strand, means for returning the strand guide relatively quickly, as compared with such slow progression, to the beginning end of the core after completion of the winding of said conical layers, means for moving said strand guide outside of its normal winding range of traverse upon said completion of winding, thereby to carry the strand out of its normal path of travel, means engageable with a strand thus carried to position the portion of the strand extending from the finished package to the strand guide in association with a fresh core for winding another package, and means operative after association of said portion of strand with said fresh core to sever the strand between the finished package and said fresh core.

15. In a winding machine, the combination of a traversing strand guide engageable with a winding strand and mechanism for driving the strand guide to distribute the strand lengthwise of a winding package core in conical layers of less length than the finished package length, while progressing relatively slowly away from the beginning end of the core to near the opposite or tip end of the core without substantially twisting the strand, means for returning the strand guide relatively quickly, as compared with such slow progression, from adjacent to the tip of the core to the beginning end of the core after completion of the winding of said conical layers, means for moving said strand guide outside of its normal winding range of traverse upon said completion of winding, thereby to carry the strand out of its normal path of travel, in combination with means for instituting winding of the strand thus carried upon a fresh core, and means for automatically moving the strand guide into traversing relation to the beginning end of the fresh core to distribute the strand thereon.

16. In a winding machine, the combination of means for holding a winding package core for rotation, said holding means including a rotatable center recessed to receive the end of said core at which winding begins on the core, a traversing strand guide for distributing the strand upon said core in conical layers of less length than the finished package length, while progressing relatively slowly away from the beginning end of the core to near the opposite or tip end of the core, means for doffing a core and the package wound thereon from said holding means, means for returning the strand guide relatively quickly, as compared with such slow progression, from adjacent to the tip of the core to adjacent to said recessed center, and means for placing on the said hollow center the strand engaged by the strand guide, said last-named means including mechanism acting to move the strand guide outside its normal range of traverse toward said hollow center after said doffing.

17. In a winding machine, the combination of means for retaining an unwinding supply mass of strand, a traversing strand guide and a winding package core holder both so disposed above the supply mass that the strand coming from the supply mass to the winding package first passes upward to the traversing guide then over the traversing guide and then downward to the core held by said holder, the core holder comprising opposed core-holding centers, in combination with means for discharging a wound package and its core from said holder while leaving the strand in said strand guide, means for placing a new core in said holder including means for presenting said core between said centers and means for causing the centers to close upon the core, and means for associating the leading end of the strand remaining in the said guide with the new core by holding the portion of strand extending from the discharged package to the strand guide in between one of said centers and the new core as the latter is received by said center.

18. In a winding machine, the combination of means for retaining an unwinding supply mass of strand, a traversing strand guide and a winding package core holder both so disposed above the supply mass that the strand coming from the supply mass to the winding package first passes upward to the traversing guide then over the traversing guide and then downward to the core held by said holder, the core holder comprising opposed core-holding centers, in combination with means for discharging a wound package and its core from said holder while leaving the strand in said strand guide, means for placing a new core in said holder including means for presenting said core between said centers and means for causing the centers to close upon the core, and means for associating the leading end of the strand remaining in the said guide with the new core including means for carrying the strand guide adjacent to one of said centers and means for causing the portion of strand extending from the discharged package to the strand guide to lie in between said center and the new core as the latter is received by said center.

19. In a winding machine, the combination of means for retaining an unwinding supply mass of strand, a traversing strand guide and a winding package core holder both so disposed above the supply mass that the strand coming from the supply mass to the winding package first passes upward to the traversing guide then over the traversing guide and then downward to the core held by said holder, the core holder comprising opposed core-holding centers in combination with means for discharging a wound package and its core from said holder, while leaving the strand in said strand guide, means for carrying the strand guide adjacent to one of said centers, means for placing a new core in said holder including means for causing said new core to enter between said centers from the side upon which, during winding, the strand runs up from the supply mass to the thread guide, and means for associating the leading end of the strand remaining in the said guide with the new core.

20. In a winding machine, the combination of means for retaining an unwinding supply mass of strand, a traversing strand guide and a winding package core holder both so disposed above the supply mass that the strand coming from the supply mass to the winding package first passes upward to the traversing guide then over the traversing guide and then downward to the core held by said holder, the core holder comprising opposed core-holding centers, in combination with means for discharging a wound package and its core from said holder while leaving the strand in said strand guide, means for placing a new core in said holder including means for supplying said core between said centers and means for causing the centers to close upon the core, means for automatically imparting a supplemental movement to said strand guide in a direction such as to cause the strand guide to clear said core supplying means when the latter supplies a new core, and means for associating the leading end of the strand remaining in the said guide with the new core.

21. In a winding machine, the combination of means for rotatably holding a winding strand package core between opposed centers for winding strand on the core from a supply thus to form a wound package, a traversing strand guide engageable with the winding strand and mechanism for driving the strand guide to distribute the strand in conical layers of less length than the finished package length while progressing relatively slowly away from the beginning end of the core to near the opposite or tip end of the core, means for releasing the core and its package from the centers, the parts being so arranged that upon such release the package falls by gravity, means for detaining the filled package after release, means effective after completion of the winding of said conical layers to return the strand guide relatively quickly, as compared with such slow progression, toward the center at the said beginning end, means for detaining the strand leading through the strand guide from the supply to said released package in between a new core and said center at the beginning end, and means for automatically severing the strand between the new core and the detained filled package.

22. In a winding machine, the combination of a holder for rotatably holding a package core for winding a package thereon from a supply, a traversing strand guide engageable with the winding strand and mechanism for driving the strand guide to distribute the strand in conical layers of less length than the finished package length while progressing relatively slowly away from the beginning end of the core to near the opposite or tip end of the core, means for disengaging the core from the holder, the parts being so arranged that the core and the package wound thereon drops by gravity upon being thus disengaged, a chute disposed to intercept the package as it falls, means whereby the package is temporarily detained in the chute, means effective during detent of the package in the chute to return the strand guide relatively quickly, as compared with such slow progression, toward the beginning end of its path of winding traverse, means for engaging the portion of strand extending from the strand guide to the detained package with the beginning end of a new core, and means for subsequently discharging the package from said chute.

23. In a winding machine, the combination of a holder for rotatably holding a package core for winding a package thereon from a supply, a traversing strand guide engageable with the winding strand and mechanism for driving the strand guide to distribute the strand in conical layers of less length than the finished package length while progressing relatively slowly away from the beginning end of the core to near the opposite or tip end of the core, means for disengaging the core from the holder, the parts being so arranged that the core and the package wound thereon drops by gravity upon being thus disengaged, a chute disposed to intercept the package as it falls, means whereby the package is temporarily detained in the chute, means effective during detention of the package in the chute to return the strand guide relatively quickly, as compared with such slow progression, toward the beginning end of its path of winding traverse, means for engaging the portion of strand extending from the strand guide to the detained package with the beginning end of a new core, means for severing the strand leading from the supply to the said package, and means for discharging the package from said chute after such return of the strand guide, engagement of the strand with a new core and severance of the strand.

24. In a winding machine the combination of a holder for rotatably holding a package core for winding a package thereon from a supply, a traversing strand guide engageable with the winding strand and mechanism for driving the strand guide to distribute the strand in conical layers of less length than the finished package length while progressing relatively slowly away from the beginning end of the core to near the opposite or tip end of the core, means for disengaging the core from the holder, the parts being so arranged that the core and the package wound thereon drops by gravity upon being thus disengaged, a chute disposed to intercept the package as it falls, means whereby the package is detained in the chute, means for automatically associating the strand of the supply with a new core for winding thereon, said strand-associating means including means effective after completion of the winding of said conical layers to return the thread guide relatively quickly, as compared with such slow progression, toward the position to be occupied by the beginning end of said new core, means for severing the strand from the wound package between the wound package and the new core, and means for discharging the package from said chute.

25. In a winding machine, the combination of means for releasably holding a core while winding a strand thereon to form a package, means for supplying strand to be wound on the core, a traversing strand guide engageable with the winding strand and mechanism for driving the strand guide to distribute the strand in conical layers of less length than the finished package length while grogressing relatively slowly away from the beginning end of the core to near the opposite or tip end of the core, means for releasing the core from its holding means at the completion of winding, means for temporarily detaining the released core in proximity to but spaced from the winding position, means effective after completion of the winding of said conical layers to return the thread guide relatively quickly, as compared with such slow progression, toward the position to be occupied by the beginning end of the next core, means for supplying such next core to the core-holding means, and means for severing the strand between the package and the new core while the released core is so detained.

26. An automatic winding machine having therein a group of winding units, and automatic replenishing mechanism therefor, said mechanism including a core-supplying device adapted to cooperate with the several units to supply cores thereto, and means for effecting relative movement between the said group of winding units and the core-supplying device such as to bring the said device and the several winding units into cooperative relation, in combination with means for stopping such relative movement upon failure of the core-supplying device properly to supply a core to a winding unit.

27. An automatic winding machine having therein a group of winding units, and automatic replenishing mechanism therefor, said mechanism including a core-supplying device adapted to cooperate with the several units to supply cores thereto, and means for effecting relative movement between the said group of winding units and the core supplying device such as to bring the said device and the several winding units into cooperative relation, in combination with means responsive to exhaustion or stoppage in the core-supplying device, for stopping such relative movement.

28. A winding machine having therein a plurality of holders for rotatably holding winding package cores, means for causing the holders to travel in a procession in a predetermined path in relation to the machine, means for winding upon the cores during such travel, and means, responsive to the absence of a core in a holder, for stopping the travel of said holders.

29. A winding machine having therein a plurality of winding units each including means for rotating a winding strand package, a traversing element for distributing a strand on the package, and means governed by the amount of the wound strand on the winding package for advancing the traversing element with respect to the package, the machine having in combination with said winding units means for automatically returning the several traverse elements successively to predetermined positions in relation to their respective units.

30. A winding machine having therein a plurality of winding units each including traverse devices adapted to distribute a winding strand on a package in overlapping axially advancing layers, the machine having in combination with said winding units means for automatically restoring the several traverse devices successively to starting positions for beginning winding of new packages, said means comprising a cam acting successively on the traverse devices of the winding units.

31. A winding machine having therein a plurality of winding units each including a traversing yarn guide, means for moving said units in a predetermined path, means for winding yarn packages on the several units during such motion, and means for causing the several yarn guides to cross relatively slowly from one end to the opposite end of their respective winding packages while imparting a back and forth traversing motion to their respective yarn strands, in combination with means for imparting to the several yarn guides in succession a relatively rapid return movement at a predetermined point in the path of travel of said units.

32. In a winding machine, the combination of means for automatically supplying a core for a winding package, opposed centers adapted to hold the core for winding, a yarn guide, means for traversing the guide whereby to wind the package in a predetermined manner, the normal limits of traverse of the guide being between the ends of the core, means for doffing the completed package from said centers, and means effective after doffing the package at the completion of the winding operation for then causing the guide to move beyond the former position of the end of the core to carry the strand adjacent to the end of a new core supplied by said core-supplying means.

33. A winding machine having therein a plurality of winding units, each including opposed centers adapted to hold a core for rotation, means for simultaneously driving a plurality of said cores held in said centers to wind thereon, a magazine adapted to hold a plurality of cores to be wound, means for automatically presenting the magazine in succession to the several winding units, and means for automatically causing the centers of said units to engage and hold a core from said magazine.

34. In a winding machine, a plurality of winding devices each including a pair of spaced centers adapted to engage opposite ends of a winding core, a magazine adapted to hold a plurality of cores, means for presenting the magazine to the several winding devices in succession in position for a core in the magazine to be engaged by the said centers of the winding device, and means for movably supporting the portion of the magazine which holds the endmost core so that said portion at least of the magazine can move out of its normal position to pass the successive winding devices.

35. A winding machine having therein a plurality of devices for rotatably holding winding package cores, means for simultaneously rotating a plurality of the cores thus held to wind thereon at the same time, a magazine adapted to hold and to discharge the cores to be wound, traveling mechanism acting automatically to bring the magazine and the several core-holding devices into cooperative relation in succession, means for causing the several core-holding devices in succession to engage a core in the magazine, the magazine being so disposed with relation to the series of core-holding devices that the said traveling mechanism causes said devices in succession to withdraw a core from the magazine.

36. A winding machine having therein a plurality of devices for rotatably holding winding package cores, means for simultaneously rotating a plurality of the cores thus held to wind thereon at the same time, means for moving the core-holding devices in a predetermined path, a magabine for cores disposed adjacent to said path, and means for causing the several core-holding devices in succession to withdraw a core from said magazine.

37. A winding machine having therein a plurality of devices for rotatably holding winding package cores, means for simultaneously winding strands on a plurality of the several cores thus held, automatic winding-core replenishment mechanism adapted to supply a fresh core to any of said holding devices, means for effecting relative traveling motion competent to associate the replenishment mechanism with the several holding devices in succession, and means for automatically starting an end of strand on each replenishment winding core.

38. A winding machine having therein a plurality of core-clamping devices, means for simultaneously rotating a plurality of the cores clamped by said devices to wind on said cores, and means for automatically causing the clamping devices to release their cores in predetermined order.

39. A winding machine having therein a plurality of core-clamping devices, means for simultaneously rotating a plurality of the cores clamped by said devices to wind on said cores, clamp releasing means, and traveling mechanism acting to bring the clamp releasing means into operative relation to the several core-clamping devices in succession.

40. A winding machine having therein a plurality of core-clamping devices, means for simultaneously rotating a plurality of the cores clamped by said devices to wind on said cores, means for moving the clamping devices and their retained cores in a predetermined path, and means for causing the clamping devices severally to release the carried core at a predetermined part of said path.

41. A winding machine having therein a plurality of winding devices, each including a pair of spaced centers adapted to engage opposite ends of a winding core, a magazine adapted to hold a plurality of cores, means for moving the winding devices in a predetermined path past said magazine, means for simultaneously driving a plurality of said cores held in said centers to wind thereon, and means for causing the said spaced centers of the several winding devices to approach in passing the magazine thereby to engage and remove from the magazine a new winding core.

42. A winding machine having therein a winding unit including a stop motion device normally tending to stop winding, means for normally locking the stop motion device in an ineffective position, a detector responsive to an abnormal condition of the unwinding strand, means for causing the winding unit and stop motion device to travel during winding, and means controlled by the detector for causing the traveling motion of the unit to release said locking means, so that the stop motion device can operate.

43. A winding machine having therein a plurality of devices for holding winding cores, means for moving said devices in a predetermined path in relation to the machine, means for simultaneously rotating cores held by a plurality of said holders to wind packages thereon, means actuable by the traveling motion of said holding devices to discharge the said packages wound on said cores from the respective holding devices, and means actuable by the traveling motion of said holding devices to replenish said holding devices with fresh cores.

44. A textile machine having therein a plurality of flexibly connected winding units each adapted to carry a winding package core, means for moving the units in a path of elongated shape including a straight portion of substantial length, means for rotating the several packages during their travel in said straight portion of path, and means operative during the winding to distribute the strand in conical layers of less length than the finished package length, and means for shifting the ranges of strand traverse axially of the packages.

45. A textile machine having therein a plurality of flexibly connected winding units each adapted to carry a winding package core, means for moving the units in a path of elongated shape including a straight portion of substantial length, means for rotating the several winding packages of the units from their cores during travel in said straight portion, means operative during such rotation to distribute strands on the packages in layers of less length than the finished package length, and means for shifting the ranges of strand traverse axially of the packages.

46. A textile machine having therein a plurality of flexibly connected winding units, means for moving the units in a path of elongated shape including a straight portion of substantial length, means for rotating the winding packages of the units during their travel along the said straight portion of the path, means associated with the respective units for distributing the strand on the packages in layers of less length than the finished package length, and means for shifting the ranges of strand traverse axially of the packages to wind full packages, the several units including means adapted to receive power during travel in said straight portion to rotate the package and operate the strand distributing means.

47. A winding machine having therein core end-clamping mechanism acting automatically to clamp a core for winding, means for automatically supplying a core to said core end-clamping mechanism, and means operable after clamping of the core for rotating the clamped core to wind strand thereon, in combination with a traversing strand guide adapted to distribute the winding strand on the rotating core, the strand guide having a full stroke less than the length of the package, a driver for the strand guide extending alongside the path of the strand guide along said core, means for shifting the zone of traverse stroke of the guide axially of the core during winding to distribute the strand in conical layers of less length than the finished package, means for automatically discharging the wound core from the core end-clamping mechanism, and means acting after the wound core has been discharged from said end-clamping mechanism to move the strand guide with reference to said driver in a direction opposite to said shifting, for automatically causing the zone of the strand guide stroke to lie at one end of the new core at the start of winding thereon.

48. A winding machine having therein core end-clamping mechanism acting automatically to clamp a core for winding, means for automatically supplying a core to said core end-clamping mechanism, and means operable after clamping of the core for rotating the clamped core to wind strand thereon, in combination with a traversing strand guide adapted to distribute the winding strand on the rotating core, the strand guide having a full stroke less than the length of the package, a driver extending alongside the path of the strand guide along said core for imparting the traversing stroke to the strand guide, a releasable connection between the strand guide and driver, means for shifting the strand guide progressively along the driver thereby to shift the zone of traverse stroke of the guide axially of the core during winding, and means for automatically releasing said connection and shifting said strand guide with reference to the driver into proximity to the core end-clamping mechanism that holds the beginning end of the core, automatically causing the zone of the strand guide stroke to lie at said beginning end of the core at the start of winding thereon.

49. A winding machine having therein means for winding a strand from a supply onto a rotating core, a thread guide for traversing the strand on the core, means for causing a progressive shifting of the range of traverse in a direction along the axis of the core during winding to distribute the strand in conical layers of less length than the finished package, said shifting means including and being controlled by a feeler movable in a direction along the axis of the core and cooperating with the last-wound layer of strand as the winding progresses in combination with means for automatically stopping such traversing upon completion of the package, means for automatically returning the thread guide and the feeler to the beginning end of a core, means for automatically associating the strand with a fresh core for winding thereon, and means for automatically resuming traversing of the strand.

50. A winding machine having therein means for winding a strand from a supply onto a rotating core, a thread guide for traversing the strand on the core, a driver extending alongside the path of the thread guide along said core, means for causing a progressive shifting of the thread guide along said driver thereby to shift the range of traverse in a direction along the axis of the core during winding to distribute the strand in conical layers of less length than the finished package, said shifting means including and being controlled by a feeler movable in a direction along the axis of the core and cooperating with the last-wound layer of strand as the winding progresses, in combination with means for automatically stopping such traversing upon completion of the package, means for automatically returning the thread guide and the shifting means with reference to said driver to the beginning end of a core, means for automatically associating the strand with a fresh core for winding thereon, and means for automatically resuming traversing of the strand.

51. A winding machine having therein core end-clamping mechanism acting automatically to clamp a core for winding, means for automatically supplying a core to said core end-clamping mechanism, and means operable after clamping of the core for rotating the clamped core to wind strand thereon, in combination with a traversing strand guide adapted to distribute the winding strand on the rotating core, the strand guide having a full stroke less than the length of the package, means, including and controlled by a feeler cooperating with the last-wound layer of strand as the winding progresses, for shifting the zone of traverse stroke of the guide axially of the core during winding to distribute the strand in conical layers of less length than the finished package, and means for automatically carrying the strand guide and feeler, in the reverse direction from that of said axial shifting, into proximity to the core end-clamping mechanism that holds one end of the core, prior to the clamping of a new core by said end-clamping mechanism, automatically causing the zone of the strand guide stroke to lie at one end of the new core at the start of winding thereon.

52. A winding machine having therein means for winding a strand from a supply onto a rotating core, a thread guide for traversing the strand on the core, means for causing a progressive shifting of the range of traverse in a direction along the axis of the core during winding to distribute the strand in conical layers of less length than the finished package, said shifting means including and being controlled by a feeler movable in a direction along the axis of the core and cooperating with the last-wound layer of strand as the winding progresses in combination with means for automatically stopping such traversing upon completion of the package, means for automatically returning the thread guide and the feeler to the beginning end of a core, means acting before the return of the feeler for causing a displacement of the relative positions of the completed package and the path of travel of the feeler, from their relative positions during winding, means for automatically associating the strand with a fresh core for winding thereon, and means for automatically resuming traversing of the strand.

53. A winding machine having therein means for winding a strand from a supply onto a rotating core, a thread guide for traversing the strand on the core, means for causing a progressive shifting of the range of traverse in a direction along the axis of the core during winding to distribute the strand in conical layers of less length than the finished package, said shifting means including and being controlled by a feeler movable in a direction along the axis of the core and cooperating with the last-wound layer of strand as the winding progresses in combination with means for automatically stopping such traversing upon completion of the package, means for returning the thread guide and the feeler to the beginning end of a core, means acting before the return of the feeler for displacing the completed package from its winding position, means for automatically associating the strand with a fresh core for winding thereon, and means for automatically resuming traversing of the strand.

54. A winding machine having therein means for winding a strand from a supply onto a rotating core, including centers for holding the core in winding position, a thread guide for traversing the strand on the core, means for causing a progressive shifting of the range of traverse in a direction along the axis of the core during winding to distribute the strand in conical layers of less length than the finished package, said shifting means including and being controlled by a feeler movable in a direction along the axis of the core and cooperating with the last-wound layer of strand as the winding progresses in combination with means for automatically stopping such traversing upon completion of the package, means for automatically returning the thread guide and the feeler to the beginning end of a core, means acting before the return of the feeler for releasing the core and its package from the centers, means for automatically associating the strand with a fresh core for winding thereon, and means for automatically resuming traversing of the strand.

EDWARD J. ABBOTT.